United States Patent
Omote et al.

(10) Patent No.: US 11,254,200 B2
(45) Date of Patent: Feb. 22, 2022

(54) VEHICLE DRIVE DEVICE

(71) Applicant: AISIN CORPORATION, Kariya (JP)

(72) Inventors: Kenji Omote, Kariya (JP); Keishi Morita, Anjo (JP); Kenta Tamabayashi, Sabae (JP); Hiroshi Ishiyama, Chiryu (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 16/967,983

(22) PCT Filed: Jan. 29, 2019

(86) PCT No.: PCT/JP2019/002887
§ 371 (c)(1),
(2) Date: Aug. 6, 2020

(87) PCT Pub. No.: WO2019/187597
PCT Pub. Date: Oct. 3, 2019

(65) Prior Publication Data
US 2021/0379982 A1    Dec. 9, 2021

(30) Foreign Application Priority Data

Mar. 28, 2018  (JP) .............................. JP2018-061483

(51) Int. Cl.
*B60K 6/40*    (2007.10)
*B60K 6/387*    (2007.10)
(Continued)

(52) U.S. Cl.
CPC ................ *B60K 6/387* (2013.01); *B60K 6/26* (2013.01); *B60K 6/40* (2013.01); *B60K 6/48* (2013.01);
(Continued)

(58) Field of Classification Search
CPC . B60K 6/387; B60K 6/26; B60K 6/40; B60K 6/48; B60K 2006/4825; F16D 25/0638
See application file for complete search history.

(56) References Cited

U.S. PATENT DOCUMENTS

2007/0049445 A1   3/2007  Reisch et al.
2007/0175723 A1   8/2007  Blessing et al.
(Continued)

FOREIGN PATENT DOCUMENTS

DE    102015226522 A1   6/2017
FR        2814121 A1   3/2002
(Continued)

OTHER PUBLICATIONS

May 18, 2021 Search Report issued in European Patent Application No. 19775379.1.
(Continued)

*Primary Examiner* — David J Hlavka
(74) *Attorney, Agent, or Firm* — Oliff PLC

(57) ABSTRACT

A vehicle drive device includes: rotary electric machine; rotor support member; friction engagement device disposed at position on inner side in radial direction with respect to a rotor and at which friction engagement device overlaps rotor as viewed in radial direction along radial direction; and a first and second bearing that rotatably support rotor support member. Friction engagement device has a first and second engagement device disposed side by side in axial direction. First piston portion of first engagement device and a second piston portion of second engagement device are disposed separately on both sides in axial direction across a first and a second friction member. First bearing is disposed at a position at which first bearing overlaps first piston portion as viewed in the radial direction. Second bearing is disposed at a position at which second bearing overlaps second piston portion as viewed in the radial direction.

20 Claims, 4 Drawing Sheets

(51) Int. Cl.
*B60K 6/48* (2007.10)
*B60K 6/26* (2007.10)
*F16D 25/0638* (2006.01)

(52) U.S. Cl.
CPC .. *F16D 25/0638* (2013.01); *B60K 2006/4825* (2013.01)

(56) References Cited

U.S. PATENT DOCUMENTS

| | | |
|---|---|---|
| 2012/0080248 A1 | 4/2012 | Kasuya et al. |
| 2017/0203643 A1* | 7/2017 | Suyama ............... F16D 21/02 |
| 2018/0313411 A1 | 11/2018 | Satoyoshi et al. |
| 2019/0271362 A1* | 9/2019 | Lorenz ............... B60K 6/387 |
| 2019/0351752 A1 | 11/2019 | Tada et al. |

FOREIGN PATENT DOCUMENTS

| | | |
|---|---|---|
| JP | 2002-087080 A | 3/2002 |
| JP | 2007-062726 A | 3/2007 |
| JP | 2012-86827 A | 5/2012 |
| JP | 2018-184137 A | 11/2018 |
| WO | 2017/057190 A1 | 4/2017 |
| WO | 2018/181352 A1 | 10/2018 |

OTHER PUBLICATIONS

May 14, 2019 International Search Report issued in International Patent Application No. PCT/JP2019/002887.

* cited by examiner

VEHICLE DRIVE DEVICE

TECHNICAL FIELD

The preferred embodiment relates to a vehicle drive device that includes a rotary electric machine that has a stator and a rotor disposed on the inner side in the radial direction with respect to the stator and that functions as a drive force source for wheels, a rotor support member that supports the rotor, a rotation sensor that detects rotation of the rotor, and a friction engagement device disposed at a position on the inner side in the radial direction with respect to the rotor and at which the friction engagement device overlaps the rotor as viewed in the radial direction.

BACKGROUND ART

An example of such a vehicle drive device is disclosed in Patent Document 1 mentioned below. In the following description in the BACKGROUND ART field, reference numerals used in Patent Document 1 are cited in the parentheses.

Patent Document 1 describes a vehicle drive device (1) that includes a rotary electric machine (MG) that has a stator (St) and a rotor (Ro) disposed on the inner side in the radial direction (R) with respect to the stator (St) and that functions as a drive force source for wheels (W), a rotor support member (30) that supports the rotor (Ro), a rotation sensor (18) that detects rotation of the rotor (Ro), and a friction engagement device (CL1, CL2) disposed at a position on the inner side in the radial direction (R) with respect to the rotor (Ro) and at which the friction engagement device (CL1, CL2) overlaps the rotor (Ro) as viewed in the radial direction (R). In addition, the stator (St) has a stator core and a coil wound around the stator core so as to form coil end portions (Ce) that project toward both sides in the axial direction (L) from the stator core.

In the vehicle drive device (1) according to Patent Document 1, the rotor support member (30) which supports the rotor (Ro) is supported mainly by a first bearing (81) so as to be rotatable with respect to a case (2). That is, a bearing that supports the rotor support member (30) is provided at only one location. Therefore, in the vehicle drive device (1) according to Patent Document 1, a large load is applied to the first bearing (81) which supports the rotor (Ro) and the rotor support member (30). In order to enhance the durability of a rotor support structure by reducing the load on the first bearing (81), it is desirable to add a second bearing and support the rotor (Ro) and the rotor support member (30) at two locations. If the vehicle drive device (1) is increased in size by newly providing a space for the arrangement of the second bearing, however, the mountability of the vehicle drive device (1) onto a vehicle may be lowered.

RELATED ART DOCUMENTS

Patent Documents

Patent Document 1: International Publication No. 2017/057190 (WO 2017/057190) (FIG. 3)

SUMMARY OF THE INVENTION

Problem to be Solved by the Invention

Thus, it is desired to achieve a vehicle drive device that facilitates enhancing the durability of a support structure for a rotor while suppressing an increase in the size of the vehicle drive device.

Means for Solving the Problem

In view of the foregoing, the preferred embodiment provides a vehicle drive device with a characteristic configuration, that is, a vehicle drive device including:

a rotary electric machine that has a stator and a rotor disposed on an inner side in a radial direction with respect to the stator and that functions as a drive force source for wheels;

a rotor support member that supports the rotor; and a friction engagement device disposed at a position on the inner side in the radial direction with respect to the rotor and at which the friction engagement device overlaps the rotor as viewed in a radial direction along the radial direction, in which:

the vehicle drive device further includes a first bearing and a second bearing that rotatably support the rotor support member;

the friction engagement device has a first engagement device and a second engagement device disposed side by side in an axial direction;

the first engagement device has a first friction member and a first piston portion that presses the first friction member in the axial direction;

the second engagement device has a second friction member and a second piston portion that presses the second friction member in the axial direction;

the first piston portion and the second piston portion are disposed separately on both sides in the axial direction across the first friction member and the second friction member;

the first bearing is disposed at a position at which the first bearing overlaps the first piston portion as viewed in the radial direction; and the second bearing is disposed at a position at which the second bearing overlaps the second piston portion as viewed in the radial direction.

With this characteristic configuration, the first piston portion and the second piston portion are movable in the axial direction, and therefore it is easy to secure spaces for the arrangement of the first bearing and the second bearing at a position at which the first bearing overlaps the first piston portion as viewed in the radial direction and at a position at which the second bearing overlaps the second piston portion as viewed in the radial direction. Therefore, the first bearing and the second bearing can be disposed using a space that overlaps the first piston portion as viewed in the radial direction and a space that overlaps the second piston portion as viewed in the radial direction, in addition to securing a sufficient space for the arrangement of the friction engagement device on the inner side in the radial direction of the rotor. Consequently, the rotor and the rotor support member can be supported at two locations by the first bearing and the second bearing while suppressing an increase in the size of the vehicle drive device due to newly providing a space for the arrangement of the second bearing. Thus, it is easy to enhance the durability of a support structure for the rotor while suppressing an increase in the size of the vehicle drive device.

In view of the foregoing, the preferred embodiment provides a vehicle drive device with another characteristic configuration, that is, a vehicle drive device including:

a rotary electric machine that has a stator and a rotor disposed on an inner side in a radial direction with respect to the stator and that functions as a drive force source for wheels;

a rotor support member that supports the rotor;

a rotation sensor that detects rotation of the rotor; and a friction engagement device disposed at a position on the inner side in the radial direction with respect to the rotor and at which the friction engagement device overlaps the rotor as viewed in a radial direction along the radial direction, the stator having a stator core and a coil wound around the stator core so as to form coil end portions that project toward both sides in an axial direction from the stator core, in which:

the vehicle drive device further includes a first bearing and a second bearing that rotatably support the rotor support member;

the first bearing is disposed at a position at which the first bearing overlaps the coil end portion on a first axial side, which is one side in the axial direction, as viewed in the radial direction and at which the first bearing overlaps the rotor as viewed in an axial direction;

the rotation sensor is disposed at a position at which the rotation sensor overlaps the coil end portion on a second axial side, which is the other side in the axial direction, as viewed in the radial direction and at which the rotation sensor overlaps the rotor as viewed in the axial direction; and the second bearing is disposed on the inner side in the radial direction with respect to the rotation sensor and on the second axial side with respect to a center position, in the axial direction, of the rotor.

With this characteristic configuration, the first bearing and the rotation sensor are disposed using spaces on both sides in the axial direction with respect to the rotor and on the inner side in the radial direction with respect to the coil end portions. Consequently, it is possible to secure a space for the arrangement of the second bearing on the inner side in the radial direction of the rotation sensor. Therefore, the rotor and the rotor support member can be supported at two locations by the first bearing and the second bearing while suppressing an increase in the size of the vehicle drive device due to newly providing a space for the arrangement of the second bearing. Thus, it is easy to enhance the durability of a support structure for the rotor while suppressing an increase in the size of the vehicle drive device.

MODES FOR CARRYING OUT THE INVENTION

1. First Embodiment

A vehicle drive device 1 according to a first embodiment will be described below with reference to the drawings. The vehicle drive device 1 according to the present embodiment is a vehicle drive device (hybrid vehicle drive device) that drives a vehicle (hybrid vehicle) that includes both an internal combustion engine EN and a rotary electric machine MG that functions as drive force sources for wheels W. Specifically, the vehicle drive device 1 is constituted as a drive device for a one-motor parallel type hybrid vehicle.

In the following description, unless stated specifically, the terms "axial direction L", the "radial direction R", and the "circumferential direction" are defined with reference to the rotational axis of the rotary electric machine MG (an axis X illustrated in FIG. 2). Further, in the axial direction L, the side on which the internal combustion engine EN is disposed with respect to the rotary electric machine MG (right side in FIG. 2) is defined as a "first axial side L1", and the side on which a transmission TM is disposed with respect to the rotary electric machine MG (left side in FIG. 2) is defined as a "second axial side L2". In the radial direction R, meanwhile, the side toward the axis X of the rotary electric machine MG is defined as a "radially inner side R1", and the side away from the side toward the axis X of the rotary electric machine MG is defined as a "radially outer side R2".

Directions for each member indicate directions with that member assembled to the vehicle drive device 1. In addition, terms related to the direction, the position, etc. of each member may allow a difference due to a manufacturing error.

1-1. Schematic Configuration of Vehicle Drive Device

Figure 1:
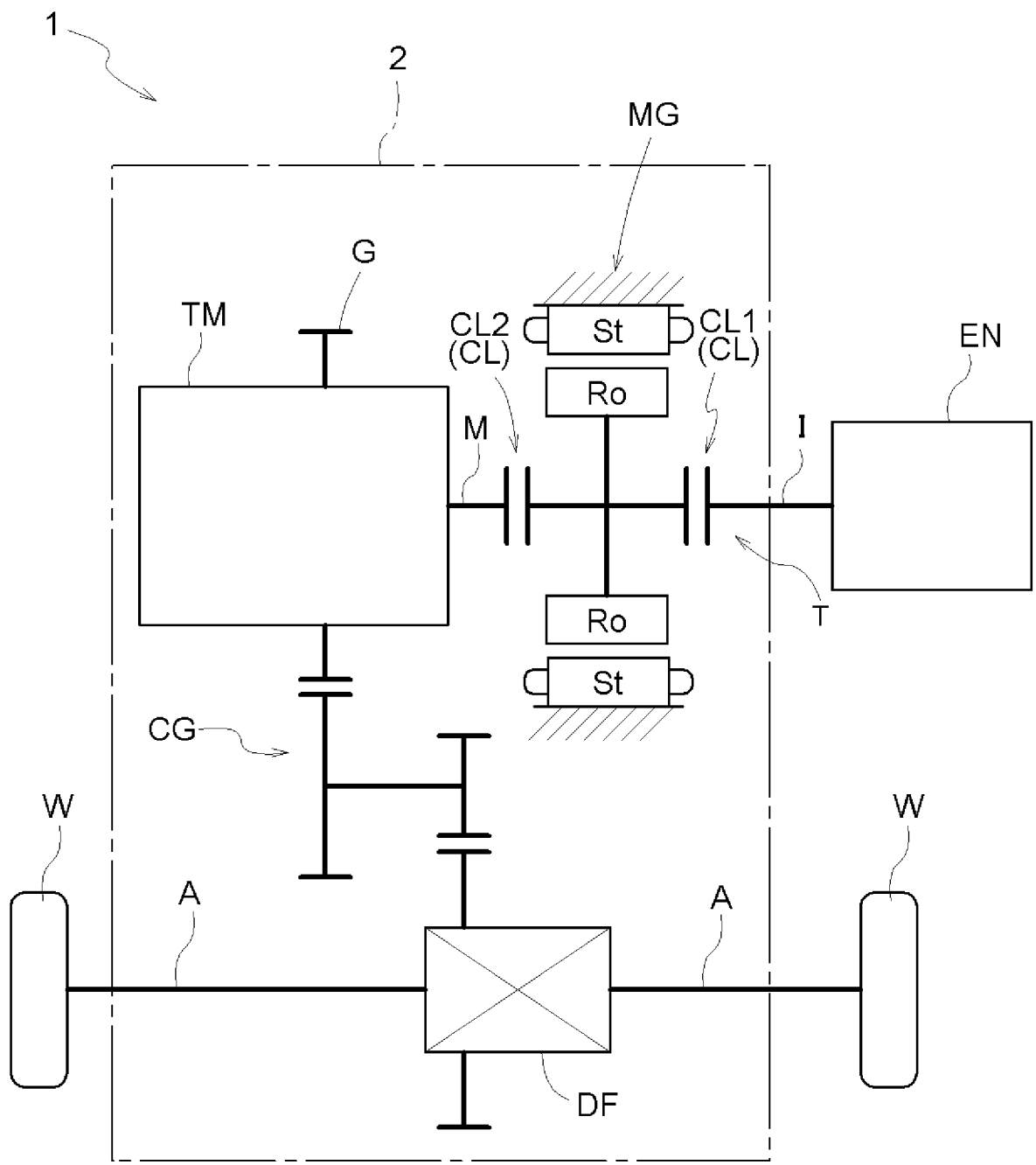
FIG. 1 is a schematic diagram illustrating a schematic configuration of a vehicle drive device according to a first embodiment.

A schematic configuration of the vehicle drive device 1 according to the present embodiment will be described. As illustrated in FIG. 1, the vehicle drive device 1 includes an input shaft I drivably coupled to the internal combustion engine EN, an intermediate shaft M drivably coupled to the wheels W, the rotary electric machine MG, a friction engagement device CL, the transmission TM, a counter gear mechanism CG, and a differential gear device DF.

The term "drivably coupled" as used herein refers to a state in which two rotary elements are coupled in such a manner that enables transfer of a drive force, which includes a state in which the two rotary elements are coupled so as to rotate together with each other, and a state in which the two rotary elements are coupled in such a manner that enables transfer of a drive force via one or two or more transmission members. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

In the present embodiment, the friction engagement device CL has a first engagement device CL1 and a second engagement device CL2. The first engagement device CL1, the rotary electric machine MG the intermediate shaft M, and the second engagement device CL2 are provided in a power transfer path T that connects between the input shaft I and the transmission TM in the order in which they are mentioned from the input shaft I side. In the present embodiment, in addition, a part of the input shaft I, the intermediate shaft M, the rotary electric machine MG the friction engagement device CL, the counter gear mechanism CG, and the differential gear device DF are housed in a case 2.

The internal combustion engine EN is a motor (such as a gasoline engine and a diesel engine) driven by combusting fuel inside the engine to take out power. In the present embodiment, the input shaft I is drivably coupled to an output shaft (such as a crankshaft) of the internal combustion engine EN via a damper (not illustrated). The input shaft I may be drivably coupled to the output shaft of the internal combustion engine EN not via the damper.

The rotary electric machine MG functions as a drive force source for the wheels W. The rotary electric machine MG can function as a motor (electric motor) that is supplied with electric power to generate power and as a generator (electric generator) that is supplied with power to generate electric power. Therefore, the rotary electric machine MG is electrically connected to an electricity accumulation device (such as a battery and a capacitor). The rotary electric machine MG is supplied with electric power from the electricity accumulation device to perform power running, or supplies electric power generated using torque of the internal combustion engine EN or an inertial force of the vehicle to the electricity accumulation device to accumulate the electric power.

The first engagement device CL1 is provided between the input shaft I and the rotary electric machine MG in the power transfer path T. The first engagement device CL1 couples and decouples the input shaft I, which is drivably coupled to the internal combustion engine E, and the rotary electric machine MG to and from each other. The first engagement device CL1 functions as an internal combustion engine-disengaging engagement device that disengages the internal combustion engine EN from the wheels W. The engagement state (direct engagement state/slip engagement state/disengaged state) of the first engagement device CL1 is controlled on the basis of a hydraulic pressure supplied to the first engagement device CL1.

The second engagement device CL2 is provided between the rotary electric machine MG and the transmission TM in the power transfer path T. The second engagement device CL2 couples and decouples the rotary electric machine MG and the intermediate shaft M, which is drivably coupled to the transmission TM, to and from each other. The intermediate shaft M serves as an input shaft of the transmission TM (transmission input shaft). The engagement state (direct engagement state/slip engagement state/disengaged state) of the second engagement device CL2 is controlled on the basis of a hydraulic pressure supplied to the second engagement device CL2.

The transmission TM transfers rotation and torque input to the intermediate shaft M to a transmission output gear G with the speed changed in accordance with a speed ratio at each timing and with torque converted. In the present embodiment, the transmission TM is a stepped automatic transmission that includes a plurality of shifting engagement devices and that switchably provides a plurality of shift speeds with different speed ratios. An automatic continuously variable transmission with continuously variable speed ratios, a stepped manual transmission that switchably provides a plurality of shift speeds with different speed ratios, etc. may also be used as the transmission TM. The transmission output gear G is drivably coupled to the differential gear device DF via the counter gear mechanism CG.

The differential gear device DF is drivably coupled to the wheels W via axles A. The differential gear device DF splits rotation and torque input to the differential gear device DF to transfer the split rotation and torque to the two wheels W. This allows the vehicle drive device 1 to transfer torque of one or both of the internal combustion engine EN and the rotary electric machine MG to the wheels W to drive the vehicle.

In the vehicle drive device 1 according to the present embodiment, the input shaft I and the intermediate shaft M are disposed coaxially with each other, and the axles A are disposed in parallel with each other and non-coaxially with the input shaft I and the intermediate shaft M, forming a multi-axis configuration. Such a configuration is suitable for the vehicle drive device 1 to be mounted on an FF (Front-Engine Front-Drive) vehicle, for example.

1-2. Configuration of Various Components of Vehicle Drive Device

The configuration of various components of the vehicle drive device 1 according to the present embodiment will be described. As illustrated in FIG. 2, the internal space of the case 2 includes a first space S1 and a second space S2. The first space S1 is disposed adjacent to the second space S2 on the first axial side L1 with respect thereto. The first space S1 is a space (dry space) to which oil is not supplied from a hydraulic pump (not illustrated). The internal combustion engine EN (see FIG. 1) and the damper (not illustrated) discussed above are disposed in the first space S1. The second space S2 is a space (wet space) to which oil is supplied from the hydraulic pump. The rotary electric machine MG, the friction engagement device CL, and the transmission TM (see FIG. 1) are disposed in the second space S2.

Figure 2:
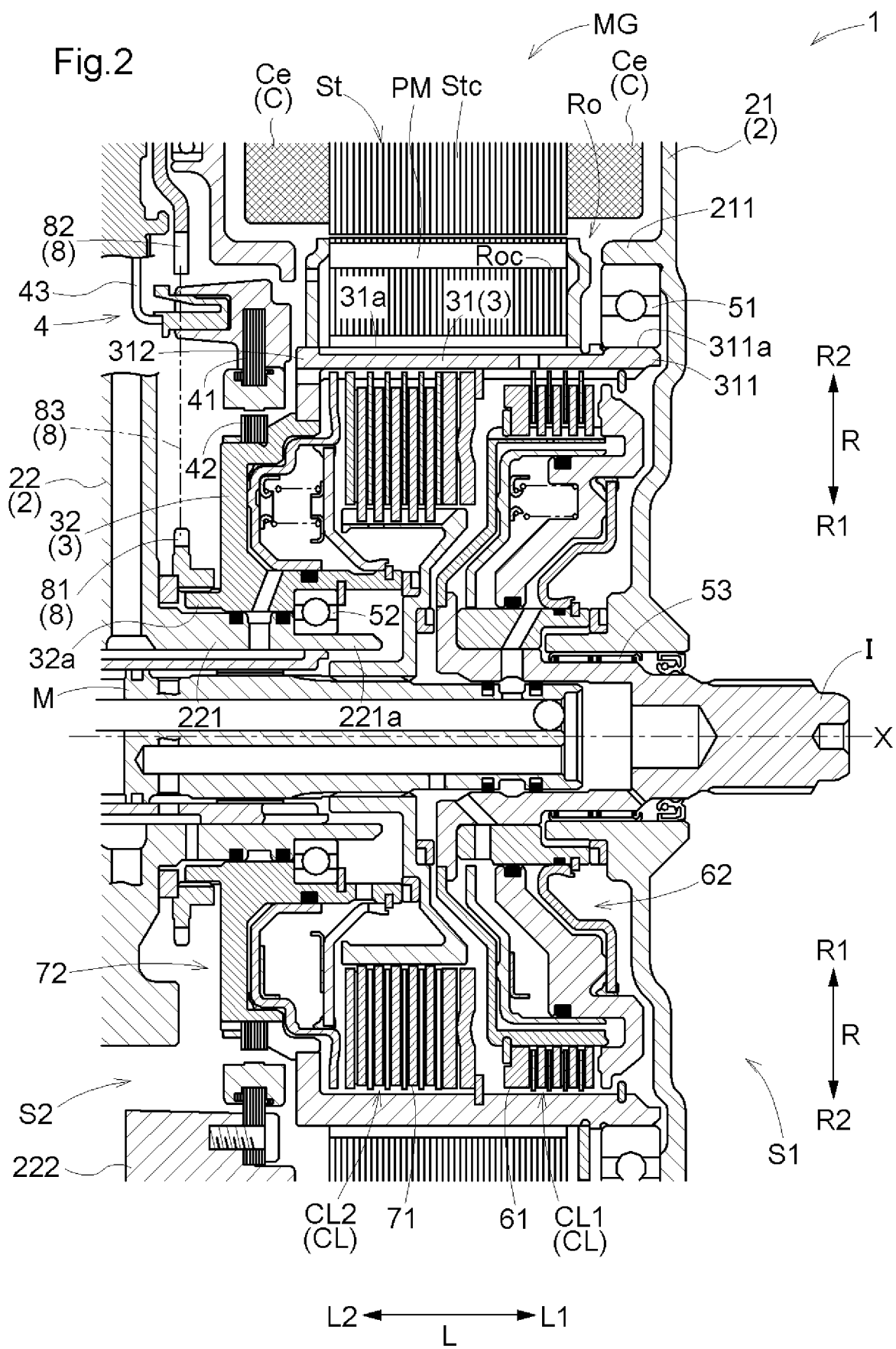
FIG. 2 is a partial sectional view of the vehicle drive device according to the first embodiment.

As illustrated in FIG. 2, the case 2 has a first side wall portion 21 and a second side wall portion 22. The first side wall portion 21 and the second side wall portion 22 extend along the radial direction R. The first side wall portion 21 is a wall that separates the first space S1 and the second space S2 from each other. The first side wall portion 21 has a through hole that penetrates the first side wall portion 21 in the axial direction L. The input shaft I is inserted through the through hole from the second axial side L2. Consequently, a portion of the input shaft I on the first axial side is positioned in the first space S1 to be coupled to the damper (not illustrated) discussed above.

The second side wall portion 22 is disposed in the second space S2. The rotary electric machine MG and the friction engagement device CL are disposed between the first side wall portion 21 and the second side wall portion 22 in the second space S2. The transmission TM (see FIG. 1) is disposed on the second axial side L2 with respect to the second side wall portion 22 in the second space S2. The second side wall portion 22 has a cylindrical sleeve portion 221 provided at an end portion of the second side wall portion 22 on the radially inner side R1 to extend along the axial direction L. The sleeve portion 221 extends along the axial direction L, and projects toward the first axial side L1 from the second side wall portion 22. The intermediate shaft M is inserted through the sleeve portion 221. An end portion of the intermediate shaft M on the first axial side L1 is inserted through the input shaft I which is formed in a cylindrical shape. Consequently, the intermediate shaft M is disposed in the case 2 in the state of penetrating the second side wall portion 22. The term "cylindrical" as used herein means having a roughly cylindrical shape as a whole, even if having some oddly shaped portions (the same also applies to other expressions related to shapes etc. to be used hereinafter).

As illustrated in FIG. 2, the rotary electric machine MG has a stator St and a rotor Ro disposed on the radially inner side R1 with respect to the stator St. The stator St has a stator core Stc and a coil C wound around the stator core Stc so as to form coil end portions Ce that project toward both sides (the first axial side L1 and the second axial side L2) in the axial direction L from the stator core Stc. The rotor Ro has a rotor core Roc and permanent magnets PM disposed in the rotor core Roc. An end of the rotor Ro on the first axial side L1 is disposed on the second axial side L2 with respect to a projecting end (an end on the first axial side L1) of the coil end portion Ce on the first axial side L1. An end of the rotor Ro on the second axial side L2 is disposed on the first axial side L1 with respect to a projecting end (an end on the second axial side L2) of the coil end portion Ce on the second axial side L2. In the present embodiment, each of the stator core Stc and the rotor core Roc is formed by stacking a plurality of stacked bodies, which are magnetic bodies (such as electromagnetic steel plates, for example) in a circular ring shape, on each other in the axial direction L.

As illustrated in FIG. 2, the vehicle drive device 1 includes a rotor support member 3 that supports the rotor Ro, a rotation sensor 4 that detects rotation of the rotor Ro, and a first bearing 51 and a second bearing 52 that rotatably support the rotor support member 3. In the present embodiment, each of the first bearing 51 and the second bearing 52 is a ball bearing.

In the present embodiment, the rotor support member 3 has a tubular portion 31 formed in a tubular shape to extend in the axial direction L, and a radially extending portion 32 that extends toward the radially inner side R1 from the tubular portion 31. The rotor Ro is attached to an outer peripheral surface 31a of the tubular portion 31. The rotor Ro is attached to the outer peripheral surface 31a by welding, crimping, etc., for example.

The tubular portion 31 is rotatably supported by the first bearing 51. In the present embodiment, the tubular portion 31 has a first projecting portion 311 that projects toward the first axial side L1 with respect to the rotor Ro, and a second projecting portion 312 that projects toward the second axial side L2 with respect to the rotor Ro. The radially extending portion 32 is coupled to the second projecting portion 312. In the illustrated example, an end portion of the radially extending portion 32 on the radially outer side R2 is coupled to an end portion of the second projecting portion 312 on the second axial side L2. In the present embodiment, the first bearing 51 is attached to a projecting portion outer peripheral surface 311a which is the outer peripheral surface of the first projecting portion 311, and the first projecting portion 311 is rotatably supported by the first bearing 51. Here, the first bearing 51 is attached to the inner peripheral surface of a bearing support portion 211 that projects toward the second axial side L2 along the axial direction L from the first side wall portion 21 of the case 2. That is, in the present embodiment, the first bearing 51 is interposed between the first projecting portion 311 and the bearing support portion 211.

The radially extending portion 32 is rotatably supported by the second bearing 52. In the present embodiment, the second bearing 52 is attached to the inner peripheral surface of an inner tubular portion 321 of the radially extending portion 32 to be discussed later. In the present embodiment, in addition, the second bearing 52 is attached to the outer peripheral surface of a distal end portion 221a of the sleeve portion 221. That is, in the present embodiment, the second bearing 52 is interposed between the inner tubular portion 321 and the distal end portion 221a.

Figure 3:
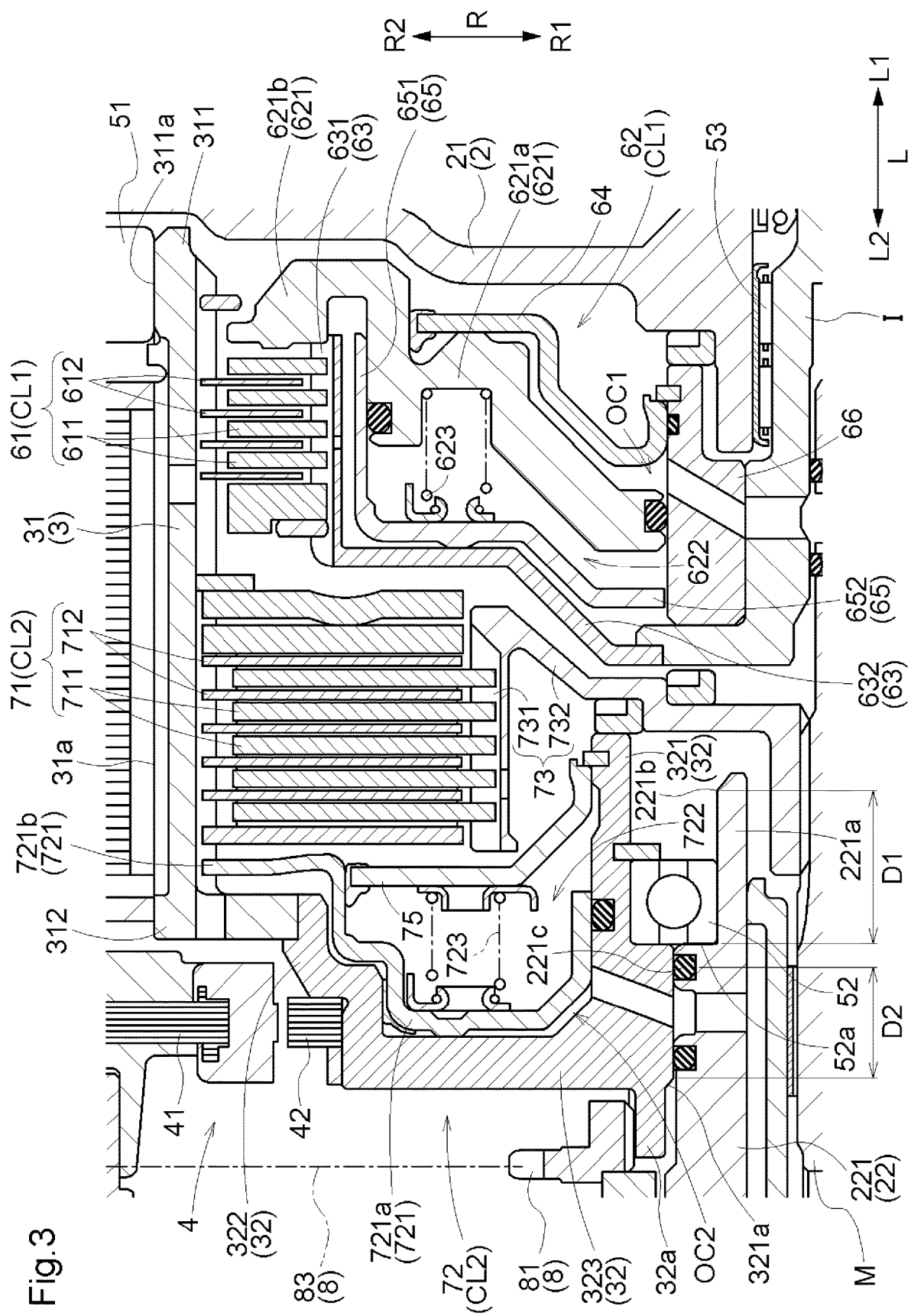
FIG. 3 is a partial enlarged sectional view of the vehicle drive device according to the first embodiment.

As illustrated in FIG. 3, the friction engagement device CL (the first engagement device CL1 and the second engagement device CL2) is disposed at a position on the radially inner side R1 with respect to the rotor Ro and at which the friction engagement device CL overlaps the rotor Ro as viewed in the radial direction R. In the present embodiment, the first engagement device CL1 and the second engagement device CL2 are disposed side by side in the axial direction L. Specifically, the first engagement device CL1 is disposed adjacent to the second engagement device CL2 on the first axial side L1 with respect thereto. With regard to the arrangement of two members (including intangible elements such as holes), the phrase "overlap each other as viewed in a specific direction" as used herein indicates that when an imaginary line that is parallel to the viewing direction is moved in directions that are orthogonal to the imaginary line, the imaginary line crosses both of the two members in at least some region.

The first engagement device CL1 includes a first friction member 61 and a first drive mechanism 62 that switches the engagement state of the first friction member 61. The first friction member 61 includes first inner friction materials 611 and first outer friction materials 612 that constitute pairs. The first inner friction materials 611 and the first outer friction materials 612 are each formed in a circular ring plate shape, and disposed with the respective rotational axes thereof coinciding with each other. In addition, a plurality of first inner friction materials 611 and a plurality of first outer friction materials 612 are provided, and disposed alternately along the axial direction L. Either of the first inner friction materials 611 or the first outer friction materials 612 can serve as friction plates, and the other can serve as separator plates.

The first outer friction materials 612 are supported by the rotor support member 3. Specifically, a plurality of spline teeth that extend in the axial direction L are formed in a distributed manner in the circumferential direction on the inner peripheral portion of the rotor support member 3. Similar spline teeth are formed also on the outer peripheral portion of the first outer friction materials 612. With such spline teeth engaged with each other, the first outer friction materials 612 are supported by the rotor support member 3 from the radially outer side R2. Consequently, the first outer friction materials 612 are supported so as to be slidable in the axial direction L with rotation thereof relative to the rotor support member 3 restricted.

The first inner friction materials 611 are supported by a first support member 63 coupled to the input shaft I. The first support member 63 has a first tubular support portion 631 formed in a cylindrical shape to extend along the axial direction L, and a first plate-like support portion 632 that extends toward the radially inner side R1 from the first tubular support portion 631. A plurality of spline teeth that extend in the axial direction L are formed in a distributed manner in the circumferential direction on the outer peripheral portion of the first tubular support portion 631. Similar spline teeth are formed also on the inner peripheral portion of the first inner friction materials 611. With such spline teeth engaged with each other, the first inner friction materials 611 are supported by the first tubular support portion 631 from the radially inner side R1. Consequently, the first inner friction materials 611 are supported so as to be slidable in the axial direction L with rotation thereof relative to the first support member 63 restricted.

The first plate-like support portion 632 is formed in a circular ring plate shape to extend along the radial direction R. An end portion of the first plate-like support portion 632 on the radially outer side R2 is coupled to an end portion of the first tubular support portion 631 on the second axial side L2. In the illustrated example, the first plate-like support portion 632 is formed integrally with the first tubular support portion 631. An end portion of the first plate-like support portion 632 on the radially inner side R1 is coupled to the input shaft I.

The first drive mechanism 62 is disposed at a position on the radially inner side R1 with respect to the first friction member 61 and at which the first drive mechanism 62 overlaps the first friction member 61 as viewed in the radial direction R. The first drive mechanism 62 includes a first piston portion 621, a first cylinder portion 622, and first biasing members 623. The first piston portion 621 functions as a "driving piston" for the friction engagement device CL. The first piston portion 621 has a first sliding portion 621a that slides in the axial direction L in the first cylinder portion 622, and a first pressing portion 621b that presses the first friction member 61 from the first axial side L1. The first pressing portion 621b extends toward the radially outer side R2 from the first sliding portion 621a toward the first axial side L1 of the first friction member 61.

The first piston portion 621 is disposed on the first axial side L1 with respect to the first plate-like support portion 632 of the first support member 63. The first piston portion 621 is biased toward the first axial side L1 by the first biasing members 623. When oil at a predetermined hydraulic pressure is supplied from a hydraulic control device (not illustrated) to a first working oil chamber OC1, the first piston portion 621 slides toward the second axial side L2 against the biasing force of the first biasing members 623 in response to the hydraulic pressure to press the first friction member 61 from the first axial side L1. The first working oil chamber OC1 is formed between the first piston portion 621 and an oil chamber formation member 64.

The oil chamber formation member 64 extends toward the radially outer side R2 with respect to the input shaft I. The oil chamber formation member 64 is disposed on the opposite side (first axial side L1) of the first piston portion 621 from the first friction member 61 side in the axial direction L. In the present embodiment, the oil chamber formation member 64 is disposed at a position at which the oil chamber formation member 64 overlaps the first bearing 51 as viewed in the radial direction R. In the present embodiment, in addition, the first piston portion 621 extends toward the radially outer side R2 with respect to the oil chamber formation member 64. That is, an end portion (the first pressing portion 621b in the present example) of the first piston portion 621 on the radially outer side R2 is positioned on the radially outer side R2 with respect to an end portion of the oil chamber formation member 64 on the radially outer side R2.

A first attachment member 65 is disposed between the first piston portion 621 and the first plate-like support portion 632 of the first support member 63. The first attachment member 65 has a first tubular attachment portion 651 formed in a cylindrical shape to extend along the axial direction L, and a first plate-like attachment portion 652 that extends toward the radially inner side R1 from the first tubular attachment portion 651.

The first tubular attachment portion 651 is disposed adjacent to the first tubular support portion 631 of the first support member 63 on the radially inner side R1 with respect thereto. The first plate-like attachment portion 652 is disposed adjacent to the first plate-like support portion 632 of the first support member 63 on the first axial side L1 with respect thereto. The first biasing members 623 are interposed between the first plate-like attachment portion 652 and the first sliding portion 621a of the first piston portion 621. A plurality of first biasing members 623 are disposed at intervals in the circumferential direction. Return springs etc. may be used as the first biasing members 623, for example.

An end portion of the first plate-like attachment portion 652 on the radially outer side R2 is coupled to an end portion of the first tubular attachment portion 651 on the second axial side L2. In the illustrated example, the first plate-like attachment portion 652 is formed integrally with the first tubular attachment portion 651. An end portion of the first plate-like attachment portion 652 on the radially inner side R1 is coupled to a coupling member 66.

The coupling member 66 is formed in a cylindrical shape to extend along the axial direction L. The coupling member 66 is disposed so as to cover the outer peripheral surface of a portion of the input shaft I positioned in the second space S2, and coupled to such an outer peripheral surface. An end portion, on the radially inner side R1, of the first plate-like attachment portion 652 of the first attachment member 65 and an end portion, on the radially inner side R1, of the oil chamber formation member 64 are coupled to the outer peripheral surface of the coupling member 66.

A portion of the outer peripheral surface of the coupling member 66 between the first plate-like attachment portion 652 and the oil chamber formation member 64 functions as a sliding surface on which an end portion, on the radially inner side R1, of the first sliding portion 621a of the first piston portion 621 slides. In addition, the inner peripheral surface of the first tubular attachment portion 651 of the first attachment member 65 functions as a sliding surface on which an end portion, on the radially outer side R2, of the first sliding portion 621a of the first piston portion 621 slides. In addition, as discussed above, the first working oil chamber OC1 is formed between the first piston portion 621 and the oil chamber formation member 64. In this manner, in the present embodiment, the coupling member 66, the first attachment member 65, and the oil chamber formation member 64 function as the first cylinder portion 622.

The second engagement device CL2 includes a second friction member 71 and a second drive mechanism 72 that switches the engagement state of the second friction member 71. The second friction member 71 is longer in the radial direction R than the first friction member 61. The second friction member 71 includes second inner friction materials 711 and second outer friction materials 712 that constitute pairs. The second inner friction materials 711 and the second outer friction materials 712 are each formed in a circular ring plate shape, and disposed with the respective rotational axes thereof coinciding with each other. In addition, a plurality of second inner friction materials 711 and a plurality of second outer friction materials 712 are provided, and disposed alternately along the axial direction L. Either of the second inner friction materials 711 or the second outer friction materials 712 can serve as friction plates, and the other can serve as separator plates.

The second outer friction materials 712 are supported by the rotor support member 3. Specifically, a plurality of spline teeth that extend in the axial direction L are formed in a distributed manner in the circumferential direction on the inner peripheral portion of the rotor support member 3. Similar spline teeth are formed also on the outer peripheral portion of the second outer friction materials 712. With such spline teeth engaged with each other, the second outer friction materials 712 are supported by the rotor support member 3 from the radially outer side R2. Consequently, the second outer friction materials 712 are supported so as to be slidable in the axial direction L with rotation thereof relative to the rotor support member 3 restricted.

The second inner friction materials 711 are supported by a second support member 73 coupled to the intermediate shaft M. The second support member 73 has a second tubular support portion 731 formed in a cylindrical shape to extend along the axial direction L, and a second plate-like support portion 732 that extends toward the radially inner side R1 from the second tubular support portion 731. The second tubular support portion 731 is disposed on the radially inner side R1 with respect to the first tubular support portion 631 of the first support member 63. A plurality of spline teeth that extend in the axial direction L are formed in a distributed manner in the circumferential direction on the outer peripheral portion of the second tubular support portion 731. Similar spline teeth are formed also on the inner peripheral portion of the second inner friction materials 711. With such spline teeth engaged with each other, the second inner friction materials 711 are supported by the second tubular support portion 731 from the radially inner side R1. Consequently, the second inner friction materials 711 are supported so as to be slidable in the axial direction L with rotation thereof relative to the second support member 73 restricted.

The second plate-like support portion 732 is formed in a circular ring plate shape to extend along the radial direction R. An end portion of the second plate-like support portion 732 on the radially outer side R2 is coupled to an end portion of the second tubular support portion 731 on the first axial side L1. In the illustrated example, the second plate-like support portion 732 is formed integrally with the second tubular support portion 731. An end portion of the second plate-like support portion 732 on the radially inner side R1 is coupled to the intermediate shaft M.

As discussed above, the second friction member 71 is longer in the radial direction R than the first friction member 61. Further, the second tubular support portion 731 which supports the second inner friction materials 711 from the radially inner side R1 is disposed on the radially inner side R1 with respect to the first tubular support portion 631 which supports the first inner friction materials 611 from the radially inner side R1. Therefore, an end portion of the second friction member 71 on the radially inner side R1 is disposed on the radially inner side R1 with respect to an end portion of the first friction member 61 on the radially inner side R1.

The second drive mechanism 72 is disposed at a position on the second axial side L2 with respect to the second friction member 71 and at which the second drive mechanism 72 overlaps the second friction member 71 as viewed in the axial direction L. The second drive mechanism 72 includes a second piston portion 721, a second cylinder portion 722, and second biasing members 723. The second piston portion 721 functions as a "driving piston" for the friction engagement device CL. The second piston portion 721 has a second sliding portion 721a that slides in the axial direction L in the second cylinder portion 722, and a second pressing portion 721b that presses the second friction member 71 from the second axial side L2.

The second piston portion 721 is biased toward the second axial side L2 by the second biasing members 723. When oil at a predetermined hydraulic pressure is supplied from a hydraulic control device (not illustrated) to a second working oil chamber OC2, the second piston portion 721 slides toward the first axial side L1 against the biasing force of the second biasing members 723 in response to the hydraulic pressure to press the second friction member 71 from the second axial side L2. As discussed above, the first piston portion 621 is configured to press the first friction member 61 from the first axial side L1. In this manner, the first piston portion 621 and the second piston portion 721 are disposed separately on both sides in the axial direction L across the first friction member 61 and the second friction member 71. The second working oil chamber OC2 is formed between the second piston portion 721 and the radially extending portion 32 of the rotor support member 3. In the present embodiment, the radially extending portion 32 is disposed on the opposite side (second axial side L2) of the second piston portion 721 from the second friction member 71 side in the axial direction L.

A second attachment member 75 is disposed between the second piston portion 721 and the second friction member 71. The second attachment member 75 is formed in a circular ring plate shape to extend along the radial direction R. An end portion, on the radially inner side R1, of the second attachment member 75 is coupled to an end portion, on the radially inner side R1, of the radially extending portion 32 of the rotor support member 3. Specifically, an end portion of the second attachment member 75 on the radially inner side R1 is coupled to the outer peripheral surface of the inner tubular portion 321 of the radially extending portion 32. The second biasing members 723 are interposed between the second attachment member 75 and the second sliding portion 721a of the second piston portion 721. A plurality of second biasing members 723 are disposed at intervals in the circumferential direction. Return springs etc. may be used as the second biasing members 723, for example.

In the present embodiment, the second cylinder portion 722 is formed at a portion, on the first axial side L1, of the radially extending portion 32 of the rotor support member 3. Specifically, in the present embodiment, the radially extending portion 32 has the inner tubular portion 321, an outer tubular portion 322, and a plate-like coupling portion 323, which constitute the second cylinder portion 722.

The inner tubular portion 321 is formed in a cylindrical shape to extend along the axial direction L. The inner tubular portion 321 is disposed on the outer peripheral surface of the sleeve portion 221 of the second side wall portion 22 of the case 2. As described above, an end portion of the second attachment member 75 on the radially inner side R1 is coupled to the outer peripheral surface of the inner tubular portion 321. A portion of the outer peripheral surface of the inner tubular portion 321 on the second axial side L2 with respect to the second attachment member 75 functions as a sliding surface on which the inner peripheral surface of the second sliding portion 721a of the second piston portion 721 slides.

The outer tubular portion 322 is formed in a cylindrical shape to extend along the axial direction L. The outer tubular portion 322 is disposed on the radially outer side R2 with respect to the inner tubular portion 321. The outer tubular portion 322 is disposed so as to cover the second sliding portion 721a of the second piston portion 721 from the radially outer side R2. In the present embodiment, the second working oil chamber OC2 is disposed at a position on the radially inner side R1 with respect to the outer tubular portion 322 and at which the second working oil chamber OC2 overlaps the outer tubular portion 322 as viewed in the radial direction R. The outer tubular portion 322 corresponds to an "axially extending region" which is a region that extends in the axial direction L at a part of the radially extending portion 32 in the radial direction R. The inner peripheral surface of the outer tubular portion 322 functions as a sliding surface on which the outer peripheral surface of the second sliding portion 721a of the second piston portion 721 slides.

The plate-like coupling portion 323 is formed in a circular ring plate shape to extend along the radial direction R. An end portion of the plate-like coupling portion 323 on the radially inner side R1 is coupled to an end portion of the inner tubular portion 321 on the second axial side L2. An end portion of the plate-like coupling portion 323 on the radially outer side R2 is coupled to an end portion of the outer tubular portion 322 on the second axial side L2. In the illustrated example, the inner tubular portion 321, the outer tubular portion 322, and the plate-like coupling portion 323 are formed integrally with each other.

As illustrated in FIG. 2, the rotation sensor 4 is a sensor that detects at least one of the position, in the rotational direction, of the rotor Ro with respect to the stator St and the rotational speed of the rotor Ro. A resolver, for example, may be used as the rotation sensor 4. The rotation sensor 4 is disposed at a position at which the rotation sensor 4 overlaps the coil end portion Ce on the second axial side L2 as viewed in the radial direction R and at which the rotation sensor 4 overlaps the rotor Ro as viewed in the axial direction L. In the present embodiment, further, the rotation sensor 4 is disposed at a position at which the rotation sensor 4 also overlaps the second drive mechanism 72 of the second engagement device CL2 as viewed in the radial direction R. In the present embodiment, in addition, the rotation sensor 4 is disposed at a position at which the rotation sensor 4 overlaps the first friction member 61 of the first engagement device CL1 as viewed in the axial direction L. In the illustrated example, the rotation sensor 4 is disposed at a position at which the rotation sensor 4 overlaps the first friction member 61 of the first engagement device CL1 and the second friction member 71 of the second engagement device CL2 as viewed in the axial direction L. In the present embodiment, in addition, the rotation sensor 4 is disposed at a position on the radially outer side R2 with respect to the second piston portion 721 and at which the rotation sensor 4 overlaps the second piston portion 721 as viewed in the radial direction R.

In the present embodiment, the rotation sensor 4 includes a sensor stator 41 supported by the case 2, a sensor rotor 42 that rotates together with the rotor Ro, and a wiring portion 43 that connects the rotation sensor 4 to a control device (not illustrated) that controls the vehicle drive device 1.

Each of the sensor stator 41 and the sensor rotor 42 is formed in a cylindrical shape defined with reference to the axis X. The sensor stator 41 is fixed to a sensor support portion 222 of the case 2. The sensor rotor 42 is disposed on the radially inner side R1 with respect to the sensor stator 41. The sensor rotor 42 is coupled to the radially extending portion 32 of the rotor support member 3. In the present embodiment, the sensor rotor 42 is attached to the outer peripheral surface of the outer tubular portion 322 (see FIG. 3) of the radially extending portion 32. That is, the rotation sensor 4 is disposed at a position on the radially outer side R2 with respect to the outer tubular portion 322 and at which the rotation sensor 4 overlaps the outer tubular portion 322 as viewed in the radial direction R. The wiring portion 43 extends toward the second axial side L2 from the sensor stator 41.

In the illustrated example, the sensor stator 41 is disposed at a position at which the sensor stator 41 overlaps the rotor Ro, the first friction member 61 of the first engagement device CL1, and the second friction member 71 of the second engagement device CL2 as viewed in the axial direction L. In the illustrated example, in addition, the sensor rotor 42 is disposed at a position at which the sensor rotor 42 overlaps the first friction member 61 of the first engagement device CL1 and the second friction member 71 of the second engagement device CL2.

The first bearing 51 is disposed at a position at which the first bearing 51 overlaps the coil end portion Ce on the first axial side L1 as viewed in the radial direction R and at which the first bearing 51 overlaps the rotor Ro as viewed in the axial direction L. In the present embodiment, further, the first bearing 51 is disposed at a position on the radially outer side R2 with respect to the first engagement device CL1 and at which the first bearing 51 overlaps the first engagement device CL1 as viewed in the radial direction R. In addition, the first bearing 51 is disposed at a position at which the first bearing 51 overlaps the first piston portion 621 as viewed in the radial direction R. In the present embodiment, the first bearing 51 is disposed on the radially outer side R2 with respect to the first piston portion 621. In the present embodiment, in addition, the first bearing 51 is attached to the projecting portion outer peripheral surface 311a of the first projecting portion 311 of the tubular portion 31 of the rotor support member 3 to rotatably support the first projecting portion 311 as discussed above.

The second bearing 52 is disposed on the radially inner side R1 with respect to the rotation sensor 4 and on the second axial side L2 with respect to the center position, in the axial direction L, of the rotor Ro. In the present embodiment, the second bearing 52 is disposed at a position on the radially inner side R1 with respect to the friction engagement device CL and at which the second bearing 52 overlaps the friction engagement device CL as viewed in the radial direction R. Specifically, the second bearing 52 is disposed at a position on the radially inner side R1 with respect to the second engagement device CL2, which is one of the two friction engagement devices CL, and at which the second bearing 52 overlaps the second engagement device CL2 as viewed in the radial direction R. More particularly, the second bearing 52 is disposed at a position at which the second bearing 52 overlaps the second drive mechanism 72 of the second engagement device CL2 as viewed in the radial direction R. In addition, the second bearing 52 is disposed at a position at which the second bearing 52 overlaps the second piston portion 721 as viewed in the radial direction R. In the present embodiment, the second bearing 52 is disposed on the radially inner side R1 with respect to the second piston portion 721. In the present embodiment, in addition, the second bearing 52 rotatably supports the radially extending portion 32 of the rotor support member 3 as discussed above. In the present embodiment, in addition, the second bearing 52 is interposed between the inner tubular portion 321 of the radially extending portion 32 and the distal end portion 221a of the sleeve portion 221 of the second side wall portion 22 of the case 2 as discussed above.

The distal end portion 221a is formed along the axial direction L at an end portion of the sleeve portion 221 on the first axial side L1. Here, a distance D1 from an end portion 221b of the distal end portion 221a on the first axial side L1 to an end surface 52a of the second bearing 52 on the second axial side L2 is longer than a distance D2 from a stepped portion 321a formed on the inner peripheral surface of the inner tubular portion 321 to a seal member 221c on the first axial side L1 disposed on the outer peripheral surface of the sleeve portion 221. Consequently, the rotor support member 3 and the second bearing 52 are assembled to the sleeve portion 221 from the first axial side L1 in the process of manufacturing the vehicle drive device 1 by first fitting the distal end portion 221a to the inner peripheral surface of the second bearing 52 and thereafter fitting the seal member 221c to the inner peripheral surface of the inner tubular portion 321. Thus, the seal member 221c and the rotor support member 3 can be assembled to each other with the rotor support member 3 and the second bearing 52 and the sleeve portion 221 at a high concentricity. Hence, such components can be assembled to each other appropriately without damaging the seal member 221c.

In the present embodiment, as illustrated in FIG. 2, the vehicle drive device 1 includes a pump drive mechanism 8 that drives a hydraulic pump (not illustrated). The pump drive mechanism 8 is disposed on the second axial side L2 with respect to the rotation sensor 4 and the second engagement device CL2. The pump drive mechanism 8 includes a first sprocket 81, a second sprocket 82, and a chain 83.

The first sprocket 81 is coupled to the radially extending portion 32 of the rotor support member 3. Specifically, a pump coupling portion 32a that projects toward the second axial side L2 is formed at an end portion, on the radially inner side R1, of the radially extending portion 32 of the rotor support member 3, and the first sprocket 81 is coupled to the pump coupling portion 32a. The first sprocket 81 functions as a "pump drive member" that drives the hydraulic pump (not illustrated). The first sprocket 81 rotates about the axis X together with the rotor support member 3. The first sprocket 81 is disposed on the radially inner side R1 with respect to the rotation sensor 4. In the present embodiment, the second bearing 52 is disposed at a position on the first axial side L1 with respect to the first sprocket 81 and at which the second bearing 52 overlaps the first sprocket 81 as viewed in the axial direction L.

The second sprocket 82 is disposed on the radially outer side R2 with respect to the first sprocket 81. The second sprocket 82 rotates about an axis that is different from the axis X. The second sprocket 82 is disposed on the radially outer side R2 with respect to the rotation sensor 4. In the illustrated example, the second sprocket 82 is disposed at a position at which the second sprocket 82 overlaps the rotary electric machine MG as viewed in the axial direction L. The chain 83 is wound around the first sprocket 81 and the second sprocket 82.

In the present embodiment, in addition, the vehicle drive device 1 includes a third bearing 53 that rotatably supports the input shaft I. In the present embodiment, the third bearing 53 is disposed so as to contact the outer peripheral surface of the input shaft I. In this way, the third bearing 53 rotatably supports the input shaft I. In the present embodiment, in addition, the third bearing 53 is a needle roller bearing.

The third bearing 53 is disposed at a position on the radially inner side R1 with respect to the first piston portion 621 and at which the third bearing 53 overlaps the first piston portion 621 as viewed in the radial direction R. In the illustrated example, an end portion, on the radially inner side R1, of the first sliding portion 621a of the first piston portion 621 is disposed on the second axial side L2 with respect to the third bearing 53. An end portion (a portion connected to the first pressing portion 621b), on the radially outer side R2, of the first sliding portion 621a of the first piston portion 621 is disposed at a position on the radially outer side R2 with respect to the third bearing 53 and at which the end portion overlaps the third bearing 53 as viewed in the radial direction R.

In the present embodiment, in addition, the third bearing 53 is disposed at a position on the radially inner side R1 with respect to the oil chamber formation member 64 and at which the third bearing 53 overlaps the oil chamber formation member 64 as viewed in the radial direction R.

2. Second Embodiment

Figure 4:
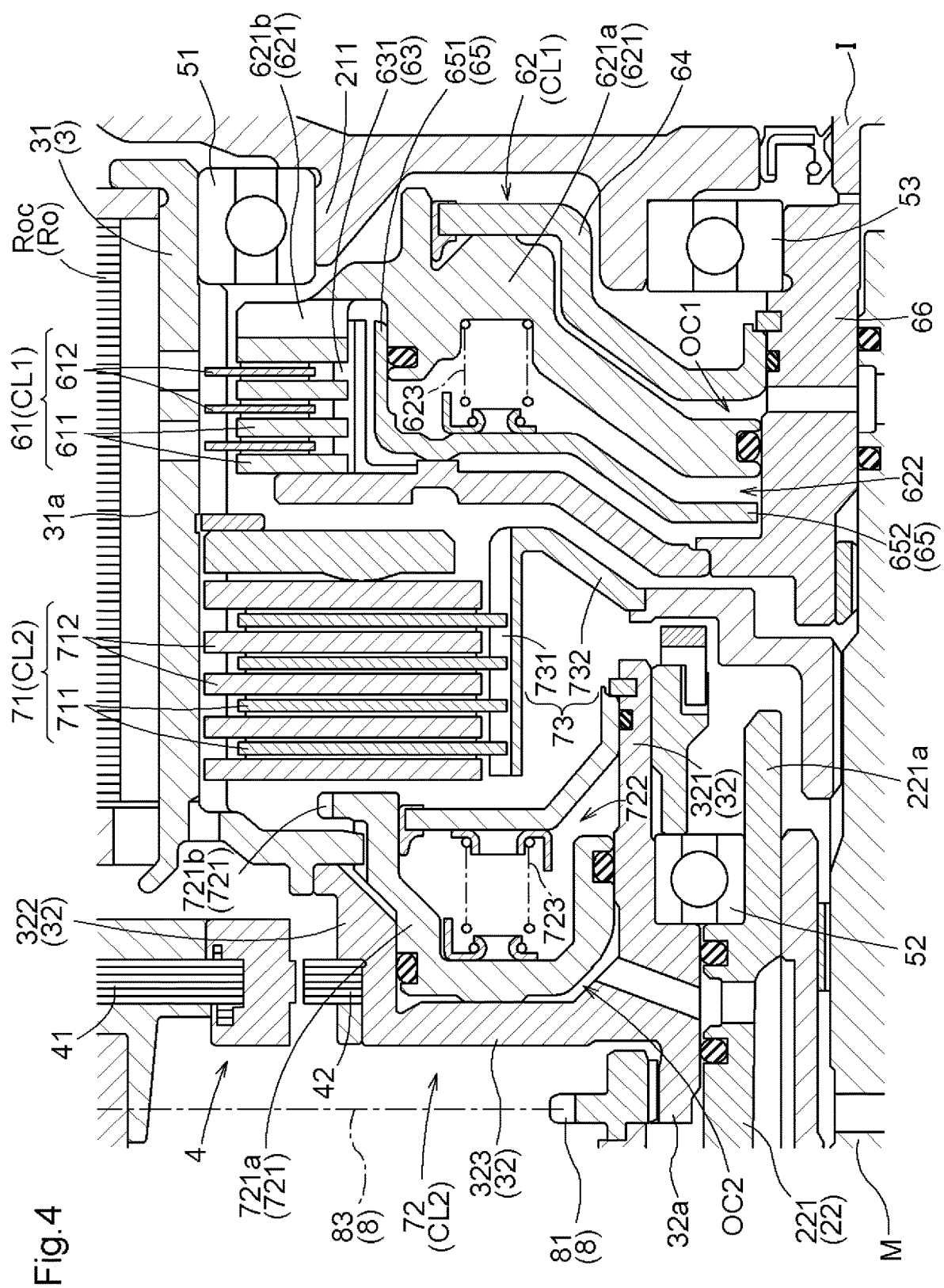
FIG. 4 is a partial enlarged sectional view of a vehicle drive device according to a second embodiment.

A vehicle drive device 1 according to a second embodiment will be described below with reference to FIG. 4. The differences from the first embodiment described above will be mainly described below. The same elements as those according to the first embodiment described above will not be particularly described.

In the present embodiment, the number of stacked bodies of each of the stator core Stc and the rotor core Roc is larger than that according to the first embodiment described above. That is, in the present embodiment, the dimension, in the axial direction L, of each of the stator St and the rotor Ro of the rotary electric machine MG is larger than that according to the first embodiment described above. In the present embodiment, the dimension, in the axial direction L, of each of the stator St and the rotor Ro of the rotary electric machine MG is increased, while maintaining the dimension, in the axial direction L, of the vehicle drive device 1, by changing the position of the first bearing 51 from the position according to the first embodiment described above.

In the present embodiment, the first bearing 51 is disposed on the inner peripheral surface of the tubular portion 31. Specifically, in the present embodiment, the tubular portion 31 of the rotor support member 3 is not provided with the first projecting portion 311, and the first bearing 51 is disposed on the inner peripheral surface of an end portion of the tubular portion 31 on the first axial side L1. Therefore, the first bearing 51 overlaps the rotor Ro as viewed in the radial direction R. In this manner, in the present embodiment, the first bearing 51 is disposed on the inner peripheral surface of the tubular portion 31, and therefore the dimension, in the radial direction R, of the first bearing 51 is small compared to the first embodiment described above. Consequently, the material cost of the first bearing 51 can be suppressed to be low.

In the present embodiment, in addition, the first bearing 51 is disposed on the outer peripheral surface of the bearing support portion 211. That is, the bearing support portion 211 according to the present embodiment is disposed on the radially inner side R1 with respect to the bearing support portion 211 according to the first embodiment described above.

In the present embodiment, in addition, the first bearing 51 is disposed at a position on the first axial side L1 with respect to the first friction member 61 and at which the first bearing 51 overlaps the first friction member 61 as viewed in the axial direction L. Accordingly, the dimension, in the axial direction L, of each of the first friction member 61 and the second friction member 71 is set to be small compared to the first embodiment described above. Therefore, in the present embodiment, the respective numbers of first inner friction materials 611 and first outer friction materials 612 of the first friction member 61 are smaller than the respective numbers of such components according to the first embodiment described above. In addition, the respective numbers of second inner friction materials 711 and second outer friction materials 712 of the second friction member 71 are smaller than the respective numbers of such components according to the first embodiment described above.

In the present embodiment, the input shaft I and the coupling member 66 are formed integrally with each other, and the third bearing 53 is disposed so as to contact the outer peripheral surface of the coupling member 66. In this way, the third bearing 53 rotatably supports the input shaft I. In the present embodiment, in addition, the third bearing 53 is a ball bearing.

The third bearing 53 is disposed at a position on the radially inner side R1 with respect to the first piston portion 621 and at which the third bearing 53 overlaps the first piston portion 621 as viewed in the radial direction R. In the illustrated example, an end portion, on the radially inner side R1, of the first sliding portion 621a of the first piston portion 621 is disposed at a position on the second axial side L2 with respect to the third bearing 53 and at which the end portion overlaps the third bearing 53 as viewed in the axial direction L. An end portion (a portion connected to the first pressing portion 621b), on the radially outer side R2, of the first sliding portion 621a of the first piston portion 621 is disposed at a position on the radially outer side R2 with respect to the third bearing 53 and at which the end portion overlaps the third bearing 53 as viewed in the radial direction R.

In the present embodiment, in addition, the third bearing 53 is disposed at a position on the radially inner side R1 with respect to the oil chamber formation member 64 and at which the third bearing 53 overlaps the oil chamber formation member 64 as viewed in the radial direction R. In the illustrated example, an end portion of the oil chamber formation member 64 on the radially inner side R1 is disposed at a position on the second axial side L2 with respect to the third bearing 53 and at which the end portion overlaps the third bearing 53 as viewed in the axial direction L. An end portion of the oil chamber formation member 64 on the radially outer side R2 is disposed at a position on the radially outer side R2 with respect to the third bearing 53 and at which the end portion overlaps the third bearing 53 as viewed in the radial direction R.

3. Other Embodiments (1) In the embodiments described above, the second bearing 52 is disposed at a position on the radially inner side R1 with respect to the friction engagement device CL and at which the second bearing 52 overlaps the friction engagement device CL as viewed in the radial direction R. However, the preferred embodiment is not limited to such a configuration. For example, the second bearing 52 may be disposed at a position at which the second bearing 52 does not overlap the friction engagement device CL as viewed in the radial direction R. Alternatively, the second bearing 52 may be disposed at a position at which the second bearing 52 overlaps the friction engagement device CL as viewed in the axial direction L. For example, the second bearing 52 is preferably disposed at a location at which the first sprocket 81 is disposed in the embodiment described above. In this case, the pump drive mechanism 8 is disposed at a different location.

(2) In the embodiment described above, the first bearing 51 is attached to the projecting portion outer peripheral surface 311a of the first projecting portion 311. However, the preferred embodiment is not limited to such a configuration. For example, the first bearing 51 may be attached to the inner peripheral surface of the first projecting portion 311. In this case, the first projecting portion 311 is preferably disposed on the radially outer side R2 compared to the embodiment described above.

(3) In the embodiments described above, the second cylinder portion 722 is formed at a portion, on the first axial side L1, of the radially extending portion 32 of the rotor support member 3. However, the preferred embodiment is not limited to such a configuration. A cylinder portion on which the second piston portion 721 slides may be provided separately.

(4) In the embodiments described above, the first sprocket 81 which functions as a pump drive member that drives a hydraulic pump is coupled to the radially extending portion 32 of the rotor support member 3. However, the preferred embodiment is not limited to such a configuration. For example, the first sprocket 81 may be coupled to a member that is different from the radially extending portion 32. Alternatively, the pump drive member may be configured differently from the chain drive mechanism described above.

(5) In the embodiments described above, the friction engagement device CL has the first engagement device CL1 and the second engagement device CL2. However, the preferred embodiment is not limited to such a configuration. One or three or more engagement devices may be provided.

(6) In the embodiment described above, the first bearing 51 is disposed at a position on the radially outer side R2 with respect to the first engagement device CL1 and at which the first bearing 51 overlaps the first engagement device CL1 as viewed in the radial direction R. However, the preferred embodiment is not limited to such a configuration. For example, the first bearing 51 may be disposed at a position at which the first bearing 51 overlaps the first engagement device CL1 as viewed in the axial direction L.

(7) In the embodiments described above, the first drive mechanism 62 is disposed at a position on the radially inner side R1 with respect to the first friction member 61 and at which the first drive mechanism 62 overlaps the first friction member 61 as viewed in the radial direction R. However, the preferred embodiment is not limited to such a configuration. The first drive mechanism 62 may be disposed at a position at which the first drive mechanism 62 overlaps the first friction member 61 as viewed in the axial direction L. In such a configuration, an end portion of the second friction member 71 on the radially inner side R1 may be disposed at a position in the radial direction R that is the same as that of an end portion of the first friction member 61 on the radially inner side R1, or may be disposed on the radially outer side R2 with respect to an end portion of the first friction member 61 on the radially inner side R1.

(8) In the embodiments described above, the rotation sensor 4 and the second bearing 52 are disposed at a position at which the rotation sensor 4 and the second bearing 52 overlap the second drive mechanism 72 as viewed in the radial direction R. However, the preferred embodiment is not limited to such a configuration. The rotation sensor 4 and the second bearing 52 may be disposed at a position at which at least one of the rotation sensor 4 and the second bearing 52 does not overlap the second drive mechanism 72 as viewed in the radial direction R.

(9) In the embodiments described above, the rotation sensor 4 is disposed at a position on the radially outer side R2 with respect to the second piston portion 721 and at which the rotation sensor 4 overlaps the second piston portion 721 as viewed in the radial direction R. However, the preferred embodiment is not limited to such a configuration. For example, the rotation sensor 4 may be disposed at a position at which the rotation sensor 4 does not overlap the second piston portion 721 as viewed in the radial direction R.

(10) In the embodiments described above, the second working oil chamber OC2 is disposed at a position on the radially inner side R1 with respect to the outer tubular portion 322 and at which the second working oil chamber OC2 overlaps the outer tubular portion 322 as viewed in the radial direction R, and the rotation sensor 4 is disposed at a position on the radially outer side R2 with respect to the outer tubular portion 322 and at which the rotation sensor 4 overlaps the outer tubular portion 322 as viewed in the radial direction R. However, the preferred embodiment is not limited to such a configuration. The second working oil chamber OC2 may be disposed on the radially outer side R2 with respect to the outer tubular portion 322, or the second working oil chamber OC2 may be disposed at a position at which the second working oil chamber OC2 does not overlap the outer tubular portion 322 as viewed in the radial direction R. In addition, the rotation sensor 4 may be disposed on the radially inner side R1 with respect to the outer tubular portion 322, or the rotation sensor 4 may be disposed at a position at which the rotation sensor 4 does not overlap the outer tubular portion 322 as viewed in the radial direction R.

(11) In the embodiments described above, the first piston portion 621 extends toward the radially outer side R2 with respect to the oil chamber formation member 64. However, the preferred embodiment is not limited to such a configuration. An end portion of the first piston portion 621 on the radially outer side R2 may not be positioned on the radially outer side R2 with respect to an end portion of the oil chamber formation member 64 on the radially outer side R2.

(12) In the embodiments described above, the oil chamber formation member 64 is disposed at a position at which the oil chamber formation member 64 overlaps the first bearing 51 as viewed in the radial direction R. However, the preferred embodiment is not limited to such a configuration. The oil chamber formation member 64 may be disposed at a position at which the oil chamber formation member 64 does not overlap the first bearing 51 as viewed in the radial direction R.

(13) In the second embodiment described above, the third bearing 53 is disposed at a position on the radially inner side R1 with respect to the first piston portion 621 and at which the third bearing 53 overlaps the first piston portion 621 as viewed in the radial direction R. However, the preferred embodiment is not limited to such a configuration. For example, the third bearing 53 may be disposed at a position at which the third bearing 53 does not overlap the first piston portion 621 as viewed in the radial direction R.

(14) The configuration disclosed in each of the embodiments discussed above may be applied in combination with a configuration disclosed in any other embodiment unless any contradiction occurs. Also regarding the other configurations, the embodiments disclosed herein are merely illustrative in all respects. Thus, a variety of alterations can be made, as appropriate, without departing from the scope and spirit of the present disclosure.

4. Overview of Above Embodiments

An overview of the vehicle drive device (1) described above will be described below.

A vehicle drive device (1) including:

a rotary electric machine (MG) that has a stator (St) and a rotor (Ro) disposed on an inner side (R1) in a radial direction (R) with respect to the stator (St) and that functions as a drive force source for wheels (W);

a rotor support member (3) that supports the rotor (Ro); and a friction engagement device (CL) disposed at a position on the inner side (R1) in the radial direction (R) with respect to the rotor (Ro) and at which the friction engagement device (CL) overlaps the rotor (Ro) as viewed in a radial direction along the radial direction (R), in which:

the vehicle drive device (1) further includes a first bearing (51) and a second bearing (52) that rotatably support the rotor support member (3);

the friction engagement device (CL) has a first engagement device (CL1) and a second engagement device (CL2) disposed side by side in an axial direction (L);

the first engagement device (CL1) has a first friction member (61) and a first piston portion (621) that presses the first friction member (61) in the axial direction (L);

the second engagement device (CL2) has a second friction member (71) and a second piston portion (721) that presses the second friction member (71) in the axial direction (L);

the first piston portion (621) and the second piston portion (721) are disposed separately on both sides (L1, L2) in the axial direction (L) across the first friction member (61) and the second friction member (71);

the first bearing (51) is disposed at a position at which the first bearing (51) overlaps the first piston portion (621) as viewed in the radial direction; and the second bearing (52) is disposed at a position at which the second bearing (52) overlaps the second piston portion (721) as viewed in the radial direction.

According to this configuration, the first piston portion (621) and the second piston portion (721) are movable in the axial direction (L), and therefore it is easy to secure spaces for the arrangement of the first bearing (51) and the second bearing (52) at a position at which the first bearing (51) overlaps the first piston portion (621) as viewed in the radial direction and at a position at which the second bearing (52) overlaps the second piston portion (721) as viewed in the radial direction. Therefore, the first bearing (51) and the second bearing (52) can be disposed using a space that overlaps the first piston portion (621) as viewed in the radial direction and a space that overlaps the second piston portion (721) as viewed in the radial direction, in addition to securing a sufficient space for the arrangement of the friction engagement device (CL) on the inner side (R1) in the radial direction (R) of the rotor (Ro). Consequently, the rotor (Ro) and the rotor support member (3) can be supported at two locations by the first bearing (51) and the second bearing (52) while suppressing an increase in the size of the vehicle drive device (1) due to newly providing a space for the arrangement of the second bearing (52). Thus, it is easy to enhance the durability of a support structure for the rotor (Ro) while suppressing an increase in the size of the vehicle drive device (1).

Preferably, the first bearing (51) is disposed on an outer side (R2) in the radial direction (R) with respect to the first piston portion (621); and the second bearing (52) is disposed on the inner side (R1) in the radial direction (R) with respect to the second piston portion (721).

According to this configuration, the second bearing (52) is disposed at a position away from the rotor (Ro) toward the inner side (R1) in the radial direction (R). It is easy to secure a space for the arrangement of the second bearing (52) at a position away from the rotor (Ro) toward the inner side (R1) in the radial direction (R) compared to the vicinity of the rotor (Ro). Therefore, according to the present configuration, it is easy to suppress an increase in the size of the vehicle drive device (1).

Preferably, the vehicle drive device (1) further includes an input shaft (I) drivably coupled to a drive force source (EN)

that is different from the rotary electric machine (MG) and a third bearing (53) that rotatably supports the input shaft (I); and the third bearing (53) is disposed at a position on the inner side (R1) in the radial direction (R) with respect to the first piston portion (621) and at which the third bearing (53) overlaps the first piston portion (621) as viewed in the radial direction.

The first piston portion (621) is movable in the axial direction (L), and therefore it is easy to secure a space for the arrangement of the third bearing (53) at a position at which the third bearing (53) overlaps the first piston portion (621) as viewed in the radial direction. Therefore, according to the present configuration, the third bearing (53) can be disposed using a space on the inner side (R1) in the radial direction (R) with respect to the first piston portion (621) and at which the third bearing (53) overlaps the first piston portion (621) as viewed in the radial direction. Consequently, the input shaft (I) can be supported by the third bearing (53) while suppressing an increase in the size of the vehicle drive device (1) due to providing a space for the arrangement of the second bearing (53). Thus, it is easy to enhance the durability of a support structure for the input shaft (I) while suppressing an increase in the size of the vehicle drive device (1).

Preferably, the vehicle drive device (1) further includes a rotation sensor (4) that detects rotation of the rotor (Ro); and the rotation sensor (4) is disposed at a position on an outer side (R2) in the radial direction (R) with respect to the second piston portion (721) and at which the rotation sensor (4) overlaps the second piston portion (721) as viewed in the radial direction.

The second piston portion (721) is movable in the axial direction (L), and therefore it is easy to secure a space for the arrangement of the rotation sensor (4) at a position at which the rotation sensor (4) overlaps the second piston portion (721) as viewed in the radial direction. Therefore, according to the present configuration, the rotation sensor (4) can be disposed using a space on the outer side (R2) in the radial direction (R) with respect to the second piston portion (721) and at which the rotation sensor (4) overlaps the second piston portion (721) as viewed in the radial direction. Consequently, an increase in the size of the vehicle drive device (1) due to providing a space for the arrangement of the rotation sensor (4) can be suppressed.

Preferably, the rotor support member (3) has a tubular portion (31) formed in a tubular shape to extend in the axial direction (L), and a radially extending portion (32) that extends from the tubular portion (31) toward the inner side (R1) in the radial direction (R);

the rotor (Ro) is attached to an outer peripheral surface (31a) of the tubular portion (31);

the first bearing (51) rotatably supports the tubular portion (31); and the second bearing (52) rotatably supports the radially extending portion (32).

According to this configuration, the radially extending portion (32) which extends from the tubular portion (31) toward the inner side (R1) in the radial direction (R) is supported by the second bearing (52). Therefore, it is easy to dispose the second bearing (52) at a position away from the rotor (Ro) toward the inner side (R1) in the radial direction (R). That is, the degree of freedom in the arrangement of the second bearing (52) can be enhanced.

In the configuration in which the rotor support member (3) has the tubular portion (31) and the radially extending portion (32), preferably, the radially extending portion (32) is disposed on an opposite side (L2) of the second piston portion (721) from a second friction member (71) side in the axial direction (L); and a second working oil chamber (OC2) to which working oil for the second piston portion (721) is supplied is formed between the radially extending portion (32) and the second piston portion (721).

According to this configuration, the second working oil chamber (OC2) can be formed using the radially extending portion (32). Thus, it is easy to reduce the size of the vehicle drive device (1) compared to a configuration in which the second working oil chamber (OC2) is provided separately.

Preferably, the radially extending portion (32) has an axially extending region (322) extending in the axial direction (L), the region being a part of the radially extending portion (32) in the radial direction (R);

the second working oil chamber (OC2) is disposed at a position on the inner side (R1) in the radial direction (R) with respect to the axially extending region (322) and at which the second working oil chamber (OC2) overlaps the axially extending region (322) as viewed in the radial direction; and a rotation sensor (4) that detects rotation of the rotor (Ro) is disposed at a position on an outer side (R2) in the radial direction (R) with respect to the axially extending region (322) and at which the rotation sensor (4) overlaps the axially extending region (322) as viewed in the radial direction.

According to this configuration, the region which overlaps the axially extending region (322) of the radially extending portion (32) as viewed in the radial direction can be utilized for both the formation of the second working oil chamber (OC2) and the arrangement of the rotation sensor (4). Thus, it is further easy to reduce the size of the vehicle drive device (1).

Preferably, the vehicle drive device (1) further includes an oil chamber formation member (64) that extends on an outer side (R2) in the radial direction (R) with respect to an input shaft (I) drivably coupled to a drive force source (EN) that is different from the rotary electric machine (MG);

the oil chamber formation member (64) is disposed on an opposite side (L1) of the first piston portion (621) from a first friction member (61) side in the axial direction (L); and a first working oil chamber (OC1) to which working oil for the first piston portion (621) is supplied is formed between the oil chamber formation member (64) and the first piston portion (621).

According to this configuration, the oil chamber formation member (64) can be disposed using a space on the outer side (R2) in the radial direction (R) with respect to the input shaft (I) and on the opposite side (L1) of the first piston portion (621) from the first friction member (61) side in the axial direction (L). Consequently, the first working oil chamber (OC1) can be formed appropriately while suppressing an increase in the size of the vehicle drive device (1) due to providing a space for the arrangement of the oil chamber formation member (64).

In the configuration in which the vehicle drive device (1) includes the oil chamber formation member (64), preferably, the first piston portion (621) extends on the outer side (R2) in the radial direction (R) with respect to the oil chamber formation member (64).

The first working oil chamber (OC1) is formed between the oil chamber formation member (64) and the first piston portion (621) in the axial direction (L), and therefore it is easy to secure a space on the outer side (R2) in the radial direction (R) with respect to the oil chamber formation member (64). Therefore, it is easy to utilize a portion of the first piston portion (621) positioned on the outer side (R2) in the radial direction (R) with respect to the oil chamber formation member (64), such as by disposing the first pressing portion (621b) which presses the first friction member (61) at an end portion of the first piston portion (621) on the outer side (R2) in the radial direction (R), for example. Thus, the dimension, in the axial direction (L), of the first piston portion (621) can be suppressed to be small, and hence an increase in the size of the vehicle drive device (1) in the axial direction (L) can be suppressed.

Preferably, the oil chamber formation member (64) is disposed at a position at which the oil chamber formation member (64) overlaps the first bearing (51) as viewed in the radial direction.

The first bearing (51) is disposed at a position at which the first bearing (51) overlaps the first piston portion (621) as viewed in the radial direction. The first piston portion (621) is disposed adjacent to the oil chamber formation member (64) so as to form the first working oil chamber (OC1) between the oil chamber formation member (64) and the first piston portion (621). According to the present configuration, the first bearing (51) is disposed at a position at which the first bearing (51) overlaps both the oil chamber formation member (64) and the first piston portion (621) as viewed in the radial direction. Consequently, it is easy to suppress an increase in the size of the vehicle drive device (1) in the axial direction (L) compared to a configuration in which the first bearing (51) does not overlap the oil chamber formation member (64) as viewed in the radial direction.

A vehicle drive device (1) including:
a rotary electric machine (MG) that has a stator (St) and a rotor (Ro) disposed on an inner side (R1) in a radial direction (R) with respect to the stator (St) and that functions as a drive force source for wheels (W);
a rotor support member (3) that supports the rotor (Ro);
a rotation sensor (4) that detects rotation of the rotor (Ro); and
a friction engagement device (CL) disposed at a position on the inner side (R1) in the radial direction (R) with respect to the rotor (Ro) and at which the friction engagement device (CL) overlaps the rotor (Ro) as viewed in a radial direction along the radial direction (R),
the stator (St) having a stator core (Stc) and a coil (C) wound around the stator core (Stc) so as to form coil end portions (Ce) that project toward both sides (L1, L2) in an axial direction (L) from the stator core (Stc), in which:
the vehicle drive device (1) further includes a first bearing (51) and a second bearing (52) that rotatably support the rotor support member (3);
the first bearing (51) is disposed at a position at which the first bearing (51) overlaps the coil end portion (Ce) on a first axial side (L1), which is one side in the axial direction (L), as viewed in the radial direction and at which the first bearing (51) overlaps the rotor (Ro) as viewed in an axial direction along the axial direction (L);
the rotation sensor (4) is disposed at a position at which the rotation sensor (4) overlaps the coil end portion (Ce) on a second axial side (L2), which is the other side in the axial direction (L), as viewed in the radial direction and at which the rotation sensor (4) overlaps the rotor (Ro) as viewed in the axial direction; and
the second bearing (52) is disposed on the inner side (R1) in the radial direction (R) with respect to the rotation sensor (4) and on the second axial side (L2) with respect to a center position, in the axial direction (L), of the rotor (Ro).

According to this configuration, the first bearing (51) and the rotation sensor (4) are disposed using spaces on both sides (L1, L2) in the axial direction (L) with respect to the rotor (Ro) and on the inner side (R1) in the radial direction (R) with respect to the coil end portions (Ce). Consequently, it is possible to secure a space for the arrangement of the second bearing (52) on the inner side (R1) in the radial direction (R) of the rotation sensor (4), in addition to securing a sufficient space for the arrangement of the friction engagement device (CL) on the inner side (R1) in the radial direction (R) of the rotor (Ro). Therefore, the rotor (Ro) and the rotor support member (3) can be supported at two locations by the first bearing (51) and the second bearing (52) while suppressing an increase in the size of the vehicle drive device (1) due to newly providing a space for the arrangement of the second bearing (52). Thus, it is easy to enhance the durability of a support structure for the rotor (Ro) while suppressing an increase in the size of the vehicle drive device (1).

Preferably, the rotor support member (3) has a tubular portion (31) formed in a tubular shape to extend in the axial direction (L), and a radially extending portion (32) that extends from the tubular portion (31) toward the inner side (R1) in the radial direction (R);
the rotor (Ro) is attached to an outer peripheral surface (31a) of the tubular portion (31);
the tubular portion (31) has a projecting portion (311) that projects toward the first axial side (L1) with respect to the rotor (Ro);
the first bearing (51) is attached to an outer peripheral surface (311a) of the projecting portion (311) to rotatably support the projecting portion (311); and
the second bearing (52) rotatably supports the radially extending portion (32).

According to this configuration, the projecting portion (311) which projects toward the first axial side (R1) with respect to the rotor (Ro) is supported by the first bearing (51). Thus, the first bearing (51) can be disposed appropriately at a position at which the first bearing (51) overlaps the coil end portion (Ce) on the first axial side (L1) as viewed in the radial direction and at which the first bearing (51) overlaps the rotor (Ro) as viewed in the axial direction. According to this configuration, in addition, the radially extending portion (32) which extends from the tubular portion (31) toward the inner side (R1) in the radial direction (R) is supported by the second bearing (52). Therefore, it is easy to dispose the second bearing (52) at a position away from the rotor (Ro) toward the inner side (R1) in the radial direction (R). That is, the degree of freedom in the arrangement of the second bearing (52) can be enhanced.

In the configuration in which the rotor support member (3) has the tubular portion (31) and the radially extending portion (32) and the tubular portion (31) has the projecting portion (311) which projects toward the first axial side (L1) with respect to the rotor (Ro), preferably,
the projecting portion (311) of the tubular portion (31) which projects toward the first axial side (L1) with respect to the rotor (Ro) is defined as a first projecting portion (311);
the tubular portion (31) has a second projecting portion (312) that projects toward the second axial side (L2) with respect to the rotor (Ro); and
the radially extending portion (32) is coupled to the second projecting portion (312).

According to this configuration, the first projecting portion (311) which projects toward the first axial side (L1) with respect to the rotor (Ro) is supported by the first bearing (51), and the radially extending portion (32) which projects toward the inner side (R1) in the radial direction (R) from the second projecting portion (312) which projects toward the second axial side (L2) with respect to the rotor (Ro) is supported by the second bearing (52). Therefore, it is easy to secure a large distance in the axial direction (L) between the first bearing (51) and the second bearing (52). That is, it is easy to support the rotor (Ro) and the rotor support member (3) at two locations which are a relatively large distance away from each other in the axial direction (L). Thus, it is further easy to enhance the durability of a support structure for the rotor (Ro).

Preferably, the radially extending portion (32) is disposed on the second axial side (L2) with respect to the friction engagement device (CL); and a cylinder portion (722) on which a driving piston (721) for the friction engagement device (CL) slides is formed at a portion of the radially extending portion (32) on the first axial side (L1).

According to this configuration, the radially extending portion (32) of the rotor support member (3) which supports the rotor (Ro) can also serve as the cylinder portion (722) on which the driving piston (721) for the friction engagement device (CL) slides. Thus, it is easy to reduce the size of the vehicle drive device (1) compared to a configuration in which the cylinder portion (722) is provided separately.

Preferably, the friction engagement device (CL) has a friction member (61) and a drive mechanism (62) that switches an engagement state of the friction member (61);

the drive mechanism (62) has a driving piston (621) and a cylinder portion (622) on which the driving piston (621) slides;

the rotation sensor (4) and the friction member (61) are disposed at a position at which the rotation sensor (4) and the friction member (61) overlap each other as viewed in the axial direction; and the cylinder portion (622) is disposed on the inner side (R1) in the radial direction (R) with respect to the friction member (61).

According to this configuration, the cylinder portion (622) is disposed on the inner side (R1) in the radial direction (R) with respect to the friction member (61). Therefore, it is easy to suppress the size of the friction engagement device (CL) in the axial direction (L) to be small compared to a configuration in which the friction member (61) and the cylinder portion (622) are disposed side by side in the axial direction (L). Hence, it is possible to suppress a region in the axial direction (L), in which the rotation sensor (4) and the friction member (61) are disposed, to be small, in a radial region in which the rotation sensor (4) and the friction member (61) overlap each other as viewed in the axial direction and the length in the axial direction (L) of which tends to be long. Thus, it is easy to suppress an increase in the size of the vehicle drive device (1) in the axial direction (L).

Preferably, the friction engagement device (CL) has a first engagement device (CL1) and a second engagement device (CL2) disposed side by side in the axial direction (L).

According to this configuration, the first engagement device (CL1) and the second engagement device (CL2) can be disposed, while suppressing an increase in the size of the vehicle drive device (1), using a space on the inner side (R1) in the radial direction (R) with respect to the rotor (Ro) and at which the first engagement device (CL1) and the second engagement device (CL2) overlap the rotor (R) as viewed in the radial direction. In this event, the first engagement device (CL1) and the second engagement device (CL2) are disposed side by side in the axial direction (L), and therefore it is particularly easy to suppress an increase in the size of the vehicle drive device (1) in the radial direction (R).

In the configuration in which the friction engagement device (CL) has the first engagement device (CL1) and the second engagement device (CL2) which are disposed side by side in the axial direction (L), preferably, the first bearing (51) is disposed at a position on an outer side (R2) in the radial direction (R) with respect to the first engagement device (CL1) and at which the first bearing (51) overlaps the first engagement device (CL1) as viewed in the radial direction; and the second bearing (52) is disposed at a position on the inner side (R1) in the radial direction (R) with respect to the second engagement device (CL2) and at which the second bearing (52) overlaps the second engagement device (CL2) as viewed in the radial direction.

According to this configuration, the first bearing (51) is disposed using a space on the outer side (R2) in the radial direction (R) with respect to the first engagement device (CL1), and the second bearing (52) is disposed using a space on the inner side (R1) in the radial direction (R) with respect to the second engagement device (CL2). Therefore, the first bearing (51) and the second bearing (52) can be disposed appropriately using spaces on the outer side (R2) in the radial direction (R) and on the inner side (R1) in the radial direction (R), which are relatively ample, for the first engagement device (CL1) and the second bearing (52) which are disposed side by side in the axial direction (L). Thus, it is further easy to enhance the durability of a support structure for the rotor (Ro) while suppressing an increase in the size of the vehicle drive device (1).

Preferably, the first engagement device (CL1) has a first friction member (61) and a first drive mechanism (62) that switches an engagement state of the first friction member (61);

the second engagement device (CL2) has a second friction member (71) and a second drive mechanism (72) that switches an engagement state of the second friction member (71);

an end portion of the second friction member (71) on the inner side (R1) in the radial direction (R) is disposed on the inner side (R1) in the radial direction (R) with respect to an end portion of the first friction member (61) on the inner side (R1) in the radial direction (R);

the first drive mechanism (62) is disposed at a position on the inner side (R1) in the radial direction (R1) with respect to the first friction member (61) and at which the first drive mechanism (62) overlaps the first friction member (61) as viewed in the radial direction;

the second drive mechanism (72) is disposed at a position on the second axial side (L2) with respect to the second friction member (71) and at which the second drive mechanism (72) overlaps the second friction member (71) as viewed in the axial direction; and the rotation sensor (4) and the second bearing (52) are disposed at a position at which the rotation sensor (4) and the second bearing (52) overlap the second drive mechanism (72) as viewed in the radial direction.

According to this configuration, the first drive mechanism (62) is disposed using a space on the inner side (R1) in the radial direction (R) with respect to the first friction member (61) and on the first axial side (L1) with respect to the second friction member (71). Therefore, it is easy to suppress an increase in the size of the vehicle drive device (1) in the axial direction (L). According to this configuration, in addition, the rotation sensor (4) is disposed using a space between the second drive mechanism (72), which is disposed on the second axial side (L2) with respect to the second friction member (71), and the coil end portion (Ce) on the second axial side (L2), and the second bearing (52) is disposed using a space on the inner side (R1) in the radial direction (R) with respect to the second drive mechanism (72). Therefore, in the configuration in which the second drive mechanism (72) is disposed on the second axial side (L2) with respect to the second friction member (71), an increase in the size of the vehicle drive device (1) in the axial direction (L) and the radial direction (R) due to the arrangement of the rotation sensor (4) and the second bearing (52) can be suppressed. Thus, it is further easy to enhance the durability of a support structure for the rotor (Ro) while suppressing an increase in the size of the vehicle drive device (1).

Preferably, the second bearing (52) is disposed at a position on the inner side (R1) in the radial direction (R) with respect to the friction engagement device (CL) and at which the second bearing (52) overlaps the friction engagement device (CL) as viewed in the radial direction.

According to this configuration, the second bearing (52) is disposed so as to overlap the friction engagement device (CL) as viewed in the radial direction using a space on the inner side (R1) in the radial direction (R) with respect to the friction engagement device (CL). Therefore, it is easy to suppress an increase in the size of the vehicle drive device (1) in the axial direction (L) compared to a configuration in which the second bearing (52) is disposed on the second axial side (L2) with respect to the friction engagement device (CL).

In the configuration in which the rotor support member (3) has the tubular portion (31) and the radially extending portion (32), preferably, a pump drive member (81) that drives a hydraulic pump is coupled to the radially extending portion (32).

According to this configuration, the radially extending portion (32) of the rotor support member (3) which supports the rotor (Ro) can also serve as a part of the pump drive mechanism (8) which drives the hydraulic pump. Thus, it is easy to reduce the size of the vehicle drive device (1) compared to a configuration in which the pump drive mechanism (8) is provided separately.

INDUSTRIAL APPLICABILITY

The technique according to the present disclosure can be utilized for a vehicle drive device that includes a rotary electric machine that has a stator and a rotor disposed on the inner side in the radial direction with respect to the stator and that functions as a drive force source for wheels, a rotor support member that supports the rotor, a rotation sensor that detects rotation of the rotor, and a friction engagement device disposed at a position on the inner side in the radial direction with respect to the rotor and at which the friction engagement device overlaps the rotor as viewed in the radial direction.

DESCRIPTION OF THE REFERENCE NUMERALS

1 VEHICLE DRIVE DEVICE
3 ROTOR SUPPORT MEMBER
31 TUBULAR PORTION
32 RADIALLY EXTENDING PORTION
4 ROTATION SENSOR
51 FIRST BEARING
52 SECOND BEARING
61 FIRST FRICTION MEMBER
621 FIRST PISTON PORTION
71 SECOND FRICTION MEMBER
721 SECOND PISTON PORTION
MG ROTARY ELECTRIC MACHINE
St STATOR
Stc STATOR CORE
C COIL
Ce COIL END PORTION
Ro ROTOR
CL FRICTION ENGAGEMENT DEVICE
CL1 FIRST ENGAGEMENT DEVICE
CL2 SECOND ENGAGEMENT DEVICE
L AXIAL DIRECTION
L1 FIRST AXIAL SIDE
L2 SECOND AXIAL SIDE
R RADIAL DIRECTION
R1 RADIALLY INNER SIDE

The invention claimed is:

1. A vehicle drive device comprising:
a rotary electric machine that has a stator and a rotor disposed on an inner side in a radial direction with respect to the stator and that functions as a drive force source for wheels;
a rotor support member that supports the rotor; and
a friction engagement device disposed at a position on the inner side in the radial direction with respect to the rotor and at which the friction engagement device overlaps the rotor as viewed in a radial direction along the radial direction, wherein:
the vehicle drive device further comprises a first bearing and a second bearing that rotatably support the rotor support member;
the friction engagement device has a first engagement device and a second engagement device disposed side by side in an axial direction;
the first engagement device has a first friction member and a first piston portion that presses the first friction member in the axial direction;
the second engagement device has a second friction member and a second piston portion that presses the second friction member in the axial direction;
the first piston portion and the second piston portion are disposed separately on both sides in the axial direction across the first friction member and the second friction member;
the first bearing is disposed at a position at which the first bearing overlaps the first piston portion as viewed in the radial direction; and
the second bearing is disposed at a position at which the second bearing overlaps the second piston portion as viewed in the radial direction.

2. The vehicle drive device according to claim 1, wherein:
the first bearing is disposed on an outer side in the radial direction with respect to the first piston portion; and
the second bearing is disposed on the inner side in the radial direction with respect to the second piston portion.

3. The vehicle drive device according to claim 1, wherein:
the vehicle drive device further comprises an input shaft drivably coupled to a drive force source that is different from the rotary electric machine and a third bearing that rotatably supports the input shaft; and
the third bearing is disposed at a position on the inner side in the radial direction with respect to the first piston portion and at which the third bearing overlaps the first piston portion as viewed in the radial direction.

4. The vehicle drive device according to claim 1, wherein:
the vehicle drive device further comprises a rotation sensor that detects rotation of the rotor; and
the rotation sensor is disposed at a position on an outer side in the radial direction with respect to the second piston portion and at which the rotation sensor overlaps the second piston portion as viewed in the radial direction.

5. The vehicle drive device according to claim 1, wherein:
the rotor support member has a tubular portion formed in a tubular shape to extend in the axial direction, and a radially extending portion that extends from the tubular portion toward the inner side in the radial direction;
the rotor is attached to an outer peripheral surface of the tubular portion;
the first bearing rotatably supports the tubular portion; and
the second bearing rotatably supports the radially extending portion.

6. The vehicle drive device according to claim 5, wherein:
the radially extending portion is disposed on an opposite side of the second piston portion from a second friction member side in the axial direction; and
a second working oil chamber to which working oil for the second piston portion is supplied is formed between the radially extending portion and the second piston portion.

7. The vehicle drive device according to claim 6, wherein:
the radially extending portion has an axially extending region extending in the axial direction, the region being a part of the radially extending portion in the radial direction;
the second working oil chamber is disposed at a position on the inner side in the radial direction with respect to the axially extending region and at which the second working oil chamber overlaps the axially extending region as viewed in the radial direction; and
a rotation sensor that detects rotation of the rotor is disposed at a position on an outer side in the radial direction with respect to the axially extending region and at which the rotation sensor overlaps the axially extending region as viewed in the radial direction.

8. The vehicle drive device according to claim 1, wherein:
the vehicle drive device further comprises an oil chamber formation member that extends on an outer side in the radial direction with respect to an input shaft drivably coupled to a drive force source that is different from the rotary electric machine;
the oil chamber formation member is disposed on an opposite side of the first piston portion from a first friction member side in the axial direction; and
a first working oil chamber to which working oil for the first piston portion is supplied is formed between the oil chamber formation member and the first piston portion.

9. The vehicle drive device according to claim 8, wherein the first piston portion extends on the outer side in the radial direction with respect to the oil chamber formation member.

10. The vehicle drive device according to claim 8, wherein
the oil chamber formation member is disposed at a position at which the oil chamber formation member overlaps the first bearing as viewed in the radial direction.

11. A vehicle drive device comprising:
a rotary electric machine that has a stator and a rotor disposed on an inner side in a radial direction with respect to the stator and that functions as a drive force source for wheels;
a rotor support member that supports the rotor;
a rotation sensor that detects rotation of the rotor; and
a friction engagement device disposed at a position on the inner side in the radial direction with respect to the rotor and at which the friction engagement device overlaps the rotor as viewed in a radial direction along the radial direction,
the stator having a stator core and a coil wound around the stator core so as to form coil end portions that project toward both sides in an axial direction from the stator core, wherein:
the vehicle drive device further comprises a first bearing and a second bearing that rotatably support the rotor support member;
the first bearing is disposed at a position at which the first bearing overlaps the coil end portion on a first axial side, which is one side in the axial direction, as viewed in the radial direction and at which the first bearing overlaps the rotor as viewed in an axial direction along the axial direction;
the rotation sensor is disposed at a position at which the rotation sensor overlaps the coil end portion on a second axial side, which is the other side in the axial direction, as viewed in the radial direction and at which the rotation sensor overlaps the rotor as viewed in the axial direction; and
the second bearing is disposed on the inner side in the radial direction with respect to the rotation sensor and on the second axial side with respect to a center position, in the axial direction, of the rotor.

12. The vehicle drive device according to claim 11, wherein:
the rotor support member has a tubular portion formed in a tubular shape to extend in the axial direction, and a radially extending portion that extends from the tubular portion toward the inner side in the radial direction;
the rotor is attached to an outer peripheral surface of the tubular portion;
the tubular portion has a projecting portion that projects toward the first axial side with respect to the rotor;
the first bearing is attached to an outer peripheral surface of the projecting portion to rotatably support the projecting portion; and
the second bearing rotatably supports the radially extending portion.

13. The vehicle drive device according to claim 12, wherein:
the projecting portion of the tubular portion which projects toward the first axial side with respect to the rotor is defined as a first projecting portion;
the tubular portion has a second projecting portion that projects toward the second axial side with respect to the rotor; and
the radially extending portion is coupled to the second projecting portion.

14. The vehicle drive device according to claim 12, wherein:
the radially extending portion is disposed on the second axial side with respect to the friction engagement device; and
a cylinder portion on which a driving piston for the friction engagement device slides is formed at a portion of the radially extending portion on the first axial side.

15. The vehicle drive device according to claim 11, wherein:
- the friction engagement device has a friction member and a drive mechanism that switches an engagement state of the friction member;
- the drive mechanism has a driving piston and a cylinder portion on which the driving piston slides;
- the rotation sensor and the friction member are disposed at a position at which the rotation sensor and the friction member overlap each other as viewed in the axial direction; and
- the cylinder portion is disposed on the inner side in the radial direction with respect to the friction member.

16. The vehicle drive device according to claim 11, wherein
- the friction engagement device has a first engagement device and a second engagement device disposed side by side in the axial direction.

17. The vehicle drive device according to claim 16, wherein:
- the first bearing is disposed at a position on an outer side in the radial direction with respect to the first engagement device and at which the first bearing overlaps the first engagement device as viewed in the radial direction; and
- the second bearing is disposed at a position on the inner side in the radial direction with respect to the second engagement device and at which the second bearing overlaps the second engagement device as viewed in the radial direction.

18. The vehicle drive device according to claim 17, wherein:
- the first engagement device has a first friction member and a first drive mechanism that switches an engagement state of the first friction member;
- the second engagement device has a second friction member and a second drive mechanism that switches an engagement state of the second friction member;
- an end portion of the second friction member on the inner side in the radial direction is disposed on the inner side in the radial direction with respect to an end portion of the first friction member on the inner side in the radial direction;
- the first drive mechanism is disposed at a position on the inner side in the radial direction with respect to the first friction member and at which the first drive mechanism overlaps the first friction member as viewed in the radial direction;
- the second drive mechanism is disposed at a position on the second axial side with respect to the second friction member and at which the second drive mechanism overlaps the second friction member as viewed in the axial direction; and
- the rotation sensor and the second bearing are disposed at a position at which the rotation sensor and the second bearing overlap the second drive mechanism as viewed in the radial direction.

19. The vehicle drive device according to claim 11, wherein
- the second bearing is disposed at a position on the inner side in the radial direction with respect to the friction engagement device and at which the second bearing overlaps the friction engagement device as viewed in the radial direction.

20. The vehicle drive device according to claim 5, wherein
- a pump drive member that drives a hydraulic pump is coupled to the radially extending portion.

* * * * *